J. Young,
Pipe Coupling.

Nº 10,617.  Patented Mar. 7, 1854.

UNITED STATES PATENT OFFICE.

JESSE YOUNG, OF FRANKLIN FURNACE, OHIO.

CONNECTING THE JOINTS OF AIR-HEATING PIPES.

Specification of Letters Patent No. 10,617, dated March 7, 1854.

*To all whom it may concern:*

Be it known that I, JESSE YOUNG, of Franklin Furnace, in the county of Scioto and State of Ohio, have invented a new and Improved Joint for Connecting Air-Heating Pipes; and I do hereby declare that the following is a full, clear, and exact description of the same, reference being had to the annexed drawings, making a part of this specification, in which—

Figure 2:
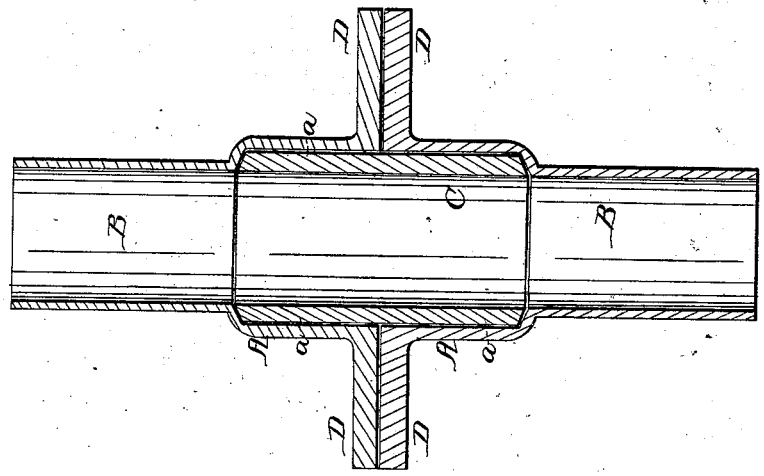
Figure 1:
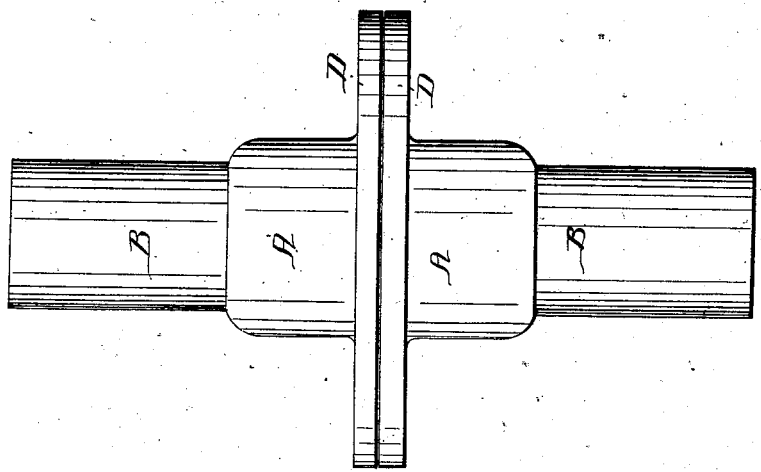

Figure 1 is an external view of my improved joint. Fig. 2 is a vertical section of ditto, the plane of section being through the center.

Similar letters of reference indicate corresponding parts in the two figures.

This invention relates to a new and improved joint for air heating pipes, whereby, owing to a peculiar form of construction, a perfectly tight joint is obtained by the unequal expansion of two different metals of which the joint is formed.

The nature of my invention consists in boring out or forming a recess at the connection or joint ends of the pipes, the recess being sufficiently large in diameter to receive a thimble, the inner diameter of which will correspond to the inner diameter of the pipes. The thimble is to be turned perfectly true on its outer side, and made of a metal more expansive than that of which the pipes are formed, so that when the thimble is heated it will expand and bind tight against the sides of the recesses and form a perfectly tight joint.

To enable others skilled in the art to fully understand and construct my invention, I will proceed to describe it.

A, A, represent the ends of two pipes, B, B, which are to be connected together. The ends are formed or cast somewhat larger in diameter than the pipes, so as to allow recesses, (a), (a), to be bored in them, sufficiently large in diameter to receive a thimble, C, the inner diameter of which will correspond to the inner diameters of the pipes, see Fig. 2. The ends, A, A, of the pipes are provided with flanches, D, D, as shown in both figures. The outer surface of the thimble, C, is to be turned perfectly true, and the thimble is to be formed of some metal more expansive than that of which the pipes are formed; for instance, if the pipes are made of cast iron, the thimble may be made of wrought iron. It will readily be seen that as the thimble, c, is heated it will bear tightly against the sides of the recesses, (a), (a), because it is formed of a more expansive metal than the pipes, B, B, and consequently a perfectly tight joint is obtained.

The socket joints are commonly employed for connecting air heating pipes, but they cannot be kept tight when exposed to a high temperature, as the outside pipe being the largest and directly exposed to the flame expands more than the inner and smaller pipe. Flanch joints are imperfect, for the reason that in horizontal pipes bolts must be employed to secure the flanches together, and the bolts, being made of wrought iron, will expand more than the cast iron pipes, and consequently as the pipes become heated the bolts will expand more than the flanches and allow the flanches to separate. This difficulty will not occur where flanch joints connect vertical pipes, because bolts need not be employed, the weight of the upper pipe being sufficient to keep the flanches in contact with each other; but another difficulty will occur, and that is, if the pipes differ a trifle from a vertical line the flanches will open on one side. This is the case in the air heating pipes for hot blast furnaces, formerly patented by me. Owing to the expansion of knobs, which serve to support annular pipes on one side, the flanch joints on the opposite side, not expanding so much, necessarily open at one side. The objections to the socket and flanch joints I have completely obviated, as my improved joint will allow the pipes to differ a little from a vertical line, sufficiently so to compensate for any expansion of larger masses of metal forming supports to horizontal pipes opposite to the joints.

What I claim as new, and desire to secure by Letters Patent, is:—

Forming a perfectly tight joint for air heating pipes, by boring out recesses, (a), (a), in the ends of the pipes, the recesses being sufficiently large to receive a thimble, C, which is made of a more expansive metal than the pipes, and which thimble, upon being heated, will, in consequence of expanding more than the pipes, bind tight against the recesses, (a), (a), in which it is fitted, and form a perfect tight joint, as herein shown and described.

JESSE YOUNG.

Witnesses:
I. W. GLIDDEN,
NANCY C. GILMAN.